T. T. NASH.
Manufacture of Screw Thread-Cutters

No. 168,577. Patented Oct. 11, 1875.

Witnesses
Thomas J. Bewley
George C. Hetzel

Inventor
Thomas T. Nash
Stephen Ustick Attorney

UNITED STATES PATENT OFFICE.

THOMAS T. NASH, OF PHILADELPHIA, PENNSYLVANIA.

IMPROVEMENT IN THE MANUFACTURE OF SCREW-THREAD CUTTERS.

Specification forming part of Letters Patent No. 168,577, dated October 11, 1875; application filed September 20, 1875.

*To all whom it may concern:*

Be it known that I, THOMAS T. NASH, of the city and county of Philadelphia, in the State of Pennsylvania, have invented an Improved Mode of Making Detachable Chasers, of which the following is a specification:

My invention relates to the construction of the detachable cutters, such as shown in my application filed August 27, 1875; and consists in the formation of a hollow cylinder, in which a screw-thread is cut from end to end, and annular dovetails formed on its periphery, at suitable distances apart, to form the proper width of the cutters when the cylinder has been separated into separate rings. The rings are then cut into pieces of a proper length for the cutters. By this means the cutters are very expeditiously and cheaply made.

If desired, instead of prolonging the cylinder of sufficient length to form a plurality of rings, it may be only of sufficient length for a single ring.

Figure 1:
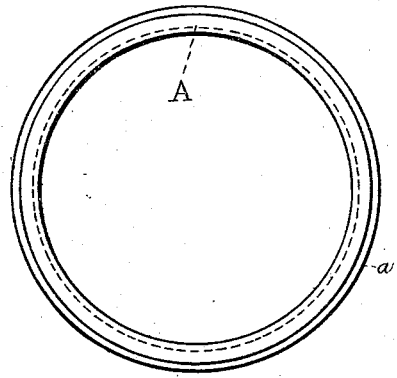
Figure 2:
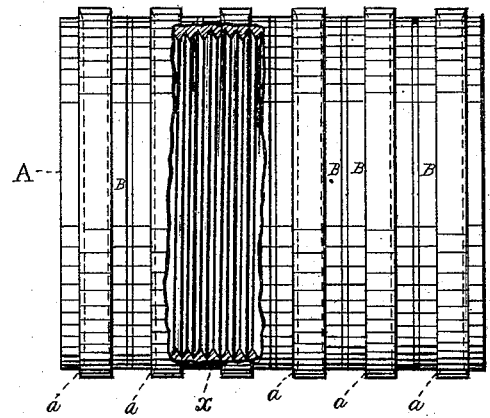
Figure 3:
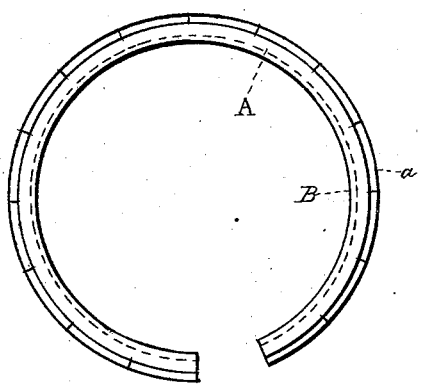
Figure 4:
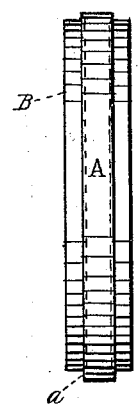
Figure 5:
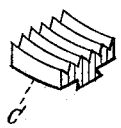

In the accompanying drawings, Figure 1 is an end view of the cylinder, having a screw-thread cut in its inner surface, and dovetails formed on its periphery. Fig. 2 is a side view of the same. It is broken away at $x$, to show the screw-threads, which extend the whole length of the cylinder. Fig. 3 is an edge view of one of the rings B severed from the cylinder. Fig. 4 is an end view of the same, with a portion cut out to form the cutter. Fig. 5 is an isometrical view of the cutter C.

Like letters of reference in all the figures indicate the same parts.

A is a hollow cylinder, which has threads cut in its internal surface throughout its whole length, a portion being represented at $x$, where the side of the cylinder is broken away for that purpose. On the periphery of the cylinder are formed annular dovetails $a$, of such distance apart that when the cylinder is separated, by means of a turning-tool, into rings B, as begun at the right-hand end, they shall be of the proper length for the cutters. An edge view of a ring, B, severed from the cylinder A, is shown in Fig. 3. The ring is marked off into equal parts of the requisite length for the cutters, as shown in Fig. 4, in which one of the pieces has been separated from the ring to form the cutter C. (Shown in Fig. 5.) After the cylinder is constructed with its threaded internal surface, and a series of annular dovetails on its periphery, it may be separated, if desired, into cutters C (represented in Fig. 5) by first separating it into longitudinal strips in width to correspond with the length of the cutter C, and then separating the strips between the dovetails, instead of separating it, in the first place, into rings, as above described.

I claim as my invention—

The mode above described of making chaser-cutters, by first constructing the cylinder A with one or more annular dovetails, $a$, on its periphery, and a threaded internal surface, and separating it into pieces of suitable dimensions to form cutters C, substantially as described.

THOMAS T. NASH.

Witnesses:
THOMAS J. BEWLEY,
STEPHEN USTICK.